455-608 AU 233 EX

FIP8106 XR 3,622,791

X179-121R
X5072W
X5322Y

United States Patent [11] 3,622,791

[72] Inventor Patrice H. Bernard
3, Avenue Montiagne, Paris, France
[21] Appl. No. 35,351
[22] Filed May 7, 1970
[45] Patented Nov. 23, 1971
[32] Priority June 27, 1969
[33] France
[31] 6921769

[54] MICROPHONE CIRCUIT FOR DIRECT CONVERSION OF SOUND SIGNALS INTO PULSE MODULATED ELECTRIC SIGNALS
6 Claims, 6 Drawing Figs.

[52] U.S. Cl. 250/199, 179/138 R
[51] Int. Cl. H04b 9/00
[50] Field of Search 179/1 MF, 138; 250/199; 350/160, 161, 163–166, 169, 170–173, 269; 356/106, 111–113

[56] References Cited

UNITED STATES PATENTS

| | | | |
|---|---|---|---|
| 3,175,088 | 3/1965 | Herriott | 250/199 |
| 3,286,032 | 11/1966 | Baum | 179/138 |
| 3,433,959 | 3/1969 | Atwood et al. | 250/199 |
| 2,997,922 | 8/1961 | Kaprelian | 250/199 |

*Primary Examiner*—Robert L. Griffin
*Assistant Examiner*—Albert J. Mayer
*Attorney*—Abraham A. Saffitz

ABSTRACT: A microphone for converting sound vibrations into a train of electrical pulses and comprising a vibratory flexible diaphragm receiving the sound pressure of sound signals on one of its surfaces, wherein a small plane mirror is secured to the other diaphragm surface; the mirror is included in an optical interferometer energized by a light source and having two propagation paths, one of which is of fixed length and the other of which has a length varying in dependence upon time in accordance with the instantaneous position of the mirror and diaphragm; the light wave trains transmitted by the paths interfere in a chosen region of the interferometer to produce at least one sequence of images whose luminosity varies in dependence upon the variable path length; and such images are received by at least one photodiode delivering electric signals which are subsequently converted into a train of electric pulses.

INVENTOR:
Patrice H. BERNARD
By: Abraham A. Saffitz
ATTORNEY

INVENTOR:

Patrice H. BERNARD

By: Abraham A. Saffitz

ATTORNEY

INVENTOR:
Patrice H. BERNARD
By: Abraham A. Saffitz
ATTORNEY

MICROPHONE CIRCUIT FOR DIRECT CONVERSION OF SOUND SIGNALS INTO PULSE MODULATED ELECTRIC SIGNALS

This invention relates to a telephone handset microphone converting received sound signals at speech frequencies into a sequence or train of pulsed electrical signals having the following characteristics:

a. All the amplitudes of the pulses are equal and independent of the amplitude and frequency of the originating sound signals;

b. For one alternation of a sinusoidal sound signal, the number of pulses emitted depends only upon the sound signal amplitude, and c. For a sinusoidal sound signal of given amplitude but varying frequency, the number of pulses emitted during a single alternation is constant, but the time interval between two consecutive pulses is smaller in proportion as the frequency is higher.

The coded signals thus produced by the microphone according to the invention are then processed, possibly remotely, for instance, in multiplexing equipment, by a number of appropriately designed logic circuits delivering signals coded in delta code. Delta modulation is well known in the art and can be used for processing encoded signals representing the mean slope between recurrent times of the speech-frequency analog signals received by the microphone. Delta modulation has of course some advantages. More particularly, every slope sample showing the amplitude variation of an analog signal during a sampling time interval is converted into a single code element per sampling period. Corresponding to a constant level—i.e., zero frequency—analog signal is a pulse train characterized by a regular alternation of zeros and ones. Coded pulses of this kind can therefore be used to synchronize (even in the absence of speech signals) a clock.

Telephone handsets having microphones according to the invention can be to conventional telephone exchanges provided that the latter include signal reconversion facilities. Handsets of this kind are very useful when associated with multiplex telephone switching equipment using delta modulation and time distribution of the channels, such as are described in U.S. application Ser. No. 834,798 filed June 19, 1969, now U.S. Pat. 3,578,915 granted May 18, 1971, to Maurice LE DORH, Yves LE GOFFIC and Fernand ARNOUAR, U.S. application Ser. No. 857,687 filed Sept. 15, 1969, in the names of the same.

In the microphone according to the invention the pulsed electrical signals are produced through the agency of an interferometer type optical system.

The vibratory acoustic diaphragm of the microphone according to the invention can be of the kind normally used in conventional handsets provided that the diaphragm is not transparent to the light radiation used in the optical system.

The invention provides a microphone converting sound vibrations into a train of electrical pulses and comprising a vibratory flexible diaphragm receiving the sound pressure of sound signals on one of its surfaces, in which a small plane mirror is secured to the other diaphragm surface; the mirror is comprised in an optical interferometer energized by a light source and having two propagation paths, one of which is of fixed length and the other of which has a length varying in dependence upon time in accordance with the instantaneous position of the mirror and diaphragm; the light wave trains transmitted by the paths interfere in a chosen region of the interferometer to produce at least one sequence of images whose luminosity varies in dependence upon the variable path length; and such images are received by at least one photodiode delivering electric signals which are subsequently converted into a train of electric pulses, processed in a coder by the delta process.

Preferably, two photodiodes are disposed in the chosen interferometer region and use one each of two variable-luminosity image sequences substantially in phase quadrature to one another.

Preferably too, the phase shift is produced by the mirror having two different zones whose reflecting layers are of different thicknesses.

According to another feature of the invention, the microphone has an extra circuit electromechanically coupled with the diaphragm to have a negative feedback effect on diaphragm movement, the extra circuit forming a part of the delta coder.

To simplify the explanation, it will be assumed hereinafter, by way of nonlimitative example, that the diaphragm is a thin circular metal plate secured right round its periphery. Stuck to the center of the plate surface opposite the acoustically energized surface is a small plane mirror; the oscillations thereof under the influence of speech modify the optical path of one of two light beams propagated in the optical system according to the invention. Consequently, there appear in an appropriate region of the system shade zones and light zones which are consecutive in time, in accordance with diaphragm movements. Consequently, if a fast-response photodiode is fixedly mounted in the zones where the interference phenomena occur, the photodiode can deliver pulse trains having the characteristic features hereinbefore outlined.

As will be seen hereinafter in the detailed description of the microphone according to the invention, the pulse train delivered by the photodiode is on its own insufficient to allow direct delta coding of the sound signals, since the pulse train output by the photodiode contains no information on the direction of instantaneous variation of the signal slope. To obviate this disadvantage, a second pulse train is produced which is substantially in phase quadrature (in time) to the first pulse train, through the agency of a second photodiode which is disposed in places where there are consecutive volumes of shade and light varying in time in accordance with diaphragm movements, the variation being phase-shifted with respect to that of the first volumes considered.

In order that the invention may be clearly understood, embodiments thereof will now be described in more detail, by way of example only, with reference to the accompanying drawings, in which.

The encoding microphone according to the invention is based on the following optical physics considerations.

Figure 1:
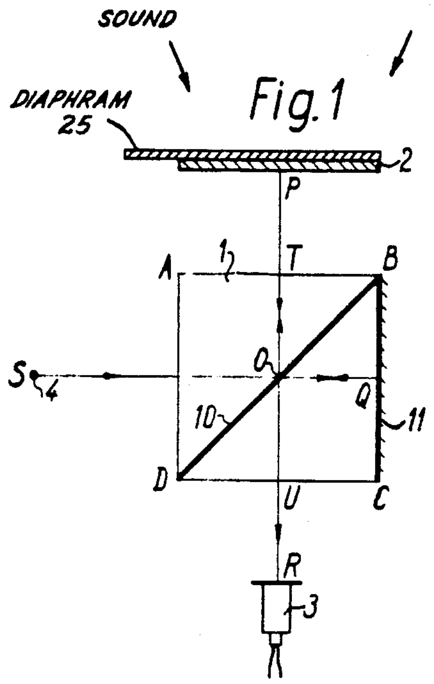
FIG. 1 shows an optical interference arrangement for producing pulsed electrical signals.

In FIG. 1 there can be seen a cube of optical glass or of quartz comparable to the "Lummer and Brodhun cube" used in some photometers. The cube 1 of FIG. 1 consists of two prism which are in cross section triangular, the triangle being right-angled and isosceles, the two prisms being placed against one another so that the hypotenuses DB of their triangular cross sections are common. The diagonal plane of the resulting cube 1 is covered by a semitransparent metal layer 10. One cube surface BC is covered by a metal layer 11 forming a reflecting surface having a coefficient of reflection near unity. A plane mirror 2 which, as will be seen hereinafter, is stuck to the center of the vibratory diaphragm 25 of the microphone, is disposed near and parallel to cube surface AB and has a coefficient of reflection substantially equal to unity. A substantially monochromatic light source 4 emits a light beam SO parallel to that axis of the cube which extends through the center of each cube surface AD and BC, the beam SO entering via the surface AD. Parallel to surface DC the aperture of a fast-response photodiode 3 receives the light beams produced by the various reflections to which the incident light beam SO is submitted.

At point O on diagonal BD the incident light beam SO divides into two parts–a part OP reflected by the semitransparent layer 10, and a part OQ which passes through the layer 10. Beam OP is reflected back by mirror 2 onto the semitransparent layer 10 and divides into two parts, one going back to the source 4 and the other part, OR, going through layer 10 and illuminating the photodiode aperture.

Beam OQ is also reflected back by wall 11 onto the semitransparent layer 10 and divides into two parts, one of which goes to the source 4 and the other part, OR, of which is reflected by layer 10 and illuminates the photodiode aperture.

Photodiode 3 therefore receives two light beams travelling along different optical path lengths and so interferences occur in the zone of the space where the photodiode 3 is disposed; consequently, the intensity of illumination incident on the photodiode aperture depends upon the position of the mirror 2.

As will be readily apparent, the difference between the lengths of the two optical paths hereinbefore considered is equal to twice the distance from the mirror 2 to the cube surface AB, that is, twice the length TP. Of course, if the quantity 2 TP is a multiple of the wavelength $\lambda$ of the light emitted by the source 4, the two light beams arrive simultaneously at the photodiode aperture and the photodiode is strongly illuminated. If the quantity 2 TP is an odd multiple of half the wavelength $\lambda$, the light beams reaching the photodiode aperture are in phase opposition and there is very little illumination of the photodiode.

Clearly, therefore, if mirror 2 is moved by amounts $n\lambda$ ($n$ being an integer) away from or towards surface AB while remaining parallel thereto, the difference between the two optical paths concerned varies by a quantity 2 $n\lambda$, and so the photodiode aperture experiences 2 $n$ alternations of illumination and darkness.

If, for instance, the source 4 emits a radiation of wavelength $\lambda$=0.633 micron, then about 0.25 mm. movement of mirror 2 corresponds to 800 shade and light alternations at the photodiode aperture.

A pulsating electrical signal is delivered by the photodiode 3 at each alternation. Clearly, therefore, counting these pulses can provide information on the values of the amplitudes of the movements of mirror 2, but this count does not give the direction of mirror movements.

Figures 2, 3:
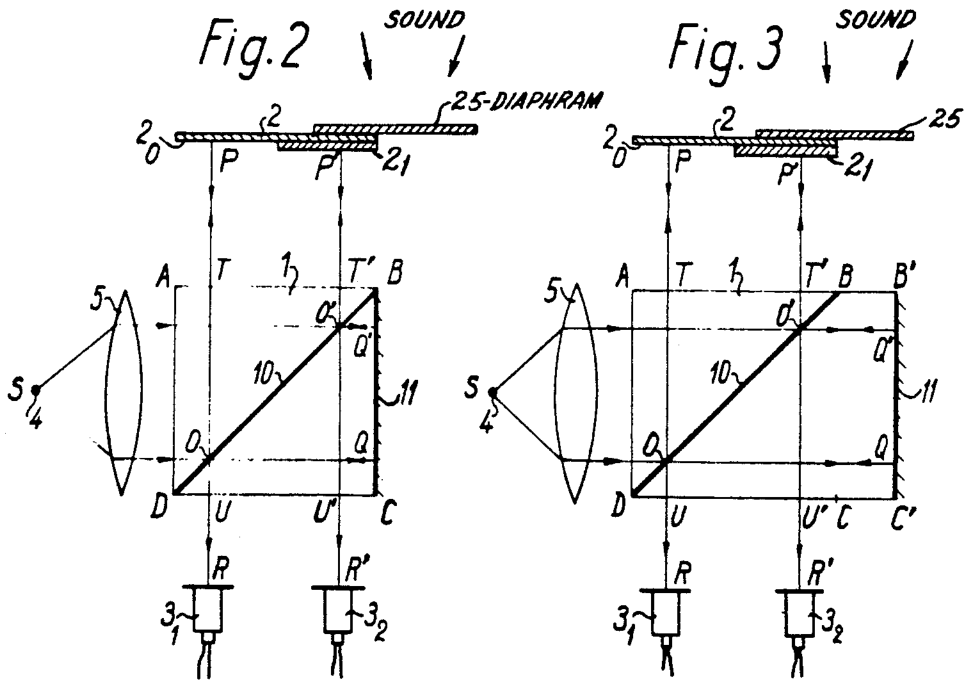
FIG. 2 shows an optical interference arrangement for producing two separate pulse trains with an appropriate time stagger between them.
FIG. 3 shows a variant of the optical interference arrangement of FIG. 2.

To determine this direction, the arrangement shown in FIG. 1 can be modified as shown in FIG. 2, where the mirror 2 has two zones differing from one another in the thickness of their metal layers. The thickness of layer $2_0$ is equal to the thickness of the layer on mirror 2 of FIG. 1. The thickness of layer $2_1$ is e.g. greater than the thickness of layer $2_0$ by an amount equal to:

$$K\frac{\lambda}{4}+\frac{\lambda}{8} \qquad (1)$$

where $\lambda$ denotes, as already stated, the wavelength of the light emitted by source 4, and K denotes a whole number which can be positive or negative or zero.

Producing a mirror of this kind presents no technological difficulties nowadays since the technique required is a normal stage in the manufacture of items such as transistors.

The light beam from source 4 is spread by means of a collimation lens 5. That part of the spread beam which is reflected by zone $2_0$ of mirror 2 behaves like the beam shown in FIG. 1. The beam reflected by zone $2_1$ behaves just like the beam reflected by zone $2_0$ but with a time stagger, since the extra thickness of the reflecting layer is in accordance with formula (1).

In short, the apertures of the photodiodes $3_1$, $3_2$ allotted to the light beams issuing from cube surface DC do not receive identical illumination at any given time. For instance, if the aperture of diode $3_1$ is passing from shade to light, the aperture of diode $3_2$ may be illuminated either very strongly or very weakly, according to the direction of movement of mirror 2.

Before considering the processing of the pulsed electrical signals from the photodiodes $3_1$, $3_2$ by a logic circuit system so as to yield delta coded signals, it should be pointed out that the arrangement shown in FIG. 2 can be modified, and one of its possible variants is shown in FIG. 3, where all the elements shown have already appeared in FIG. 2 and have the same reference numbers.

The only difference is that in FIG. 3 the volume of cube 1 is extended to the right by shifting the metallized surface BC by an amount BB' such that:

$$n_c \times BB' = PT \qquad (2)$$

where $n_c$ denotes the refractive index of the transparent material used to make the cube 1, and PT denotes the distance from cube surface AB to mirror 2 when the same is stationary (rest position). If this condition is met, the optical paths hereinbefore referred to are equal when mirror 2 is in its rest position. The arrangement of FIG. 3 is useful in cases in which the light source 4 is not substantially monochromatic, for then the optical path differences, which appear only when mirror 2 moves, are smaller than in the arrangement of FIG. 2. There can, therefore, be a wider tolerance on the narrowness of the spectral line of the light from the source 4.

Figure 4:
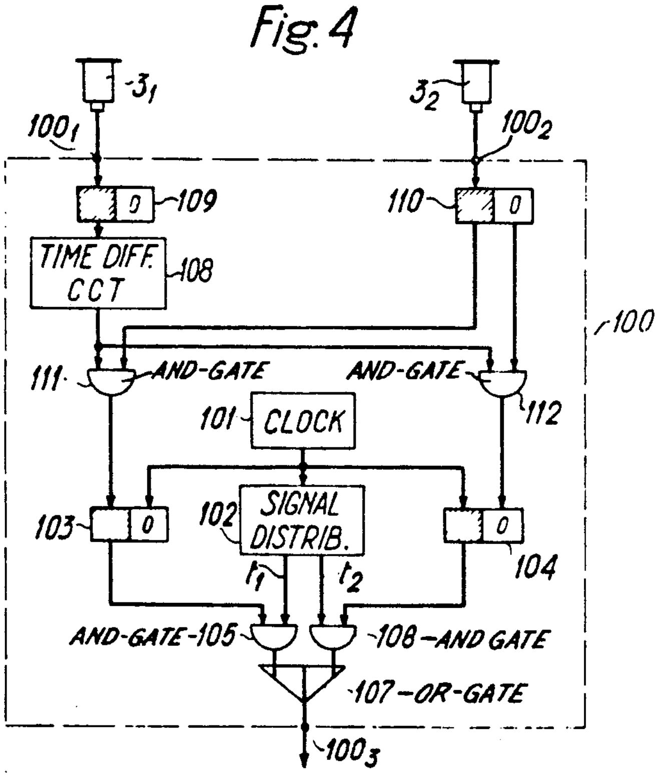
FIG. 4 shows a logic circuit for converting the coded signals delivered by a microphone according to the invention into delta coded signals.

FIG. 4 shows by way of nonlimitative example a logic circuit system processing the information in the signals from diodes $3_1$, $3_2$ so as to obtain delta coded signals. A clock 101 of a frequency of, for example, 60,000 Hz. feeds a cyclically operating signal distributor 102 determining two cyclically recurring times $t_1$, $t_2$, a bistable circuit 103, which clock 101 maintains in the "zero" state, and a bistable circuit 104, which clock 101 maintains in the "one" state.

When the photodiodes $3_1$, $3_2$ receive no pulsed signals:

a. AND-gate 105 receives:

at one input, the "one" signal emitted by the distributor 102 at the time $t_1$;

at the other input, no signal from the bistable circuit 103;

b. AND-gate 106 receives:

at one input, the "one" signal emitted by the distributor 102 at the time $t_2$;

at the other input, the "one" signal from the bistable circuit 104.

Consequently, "one" signals are collected at the time $t_2$ at output $100_3$ of OR-gate 107 whose two inputs are connected to the outputs of the AND-gates 105, 106 respectively.

The outputs of photodiodes $3_1$, $3_2$ are connected to Schmitt triggers 109, 110 which shape the pulsed signals from the photodiodes. The trigger 110 associated with photodiode $3_2$ applies:

"one" or "zero" signals to one of the inputs of AND-gate 111, whose output is connected to bistable circuit 103;

"zero" or "one" signals to one of the inputs of AND-gate 112, whose output is connected to bistable circuit 104.

Trigger 109 associated with photodiode $3_1$ applies "one" or "zero" signals to a time differentiation circuit 108 whose output is connected to the second inputs of the AND-gates 111, 112.

When a "one" signal from trigger 110 coincides with a pulse from circuit 108, AND-gate 112 becomes conductive, bistable circuit 104 changes over to the zero state, and so no pulse appears at output $100_3$ of system 100 at the time $t_2$.

Figure 5:
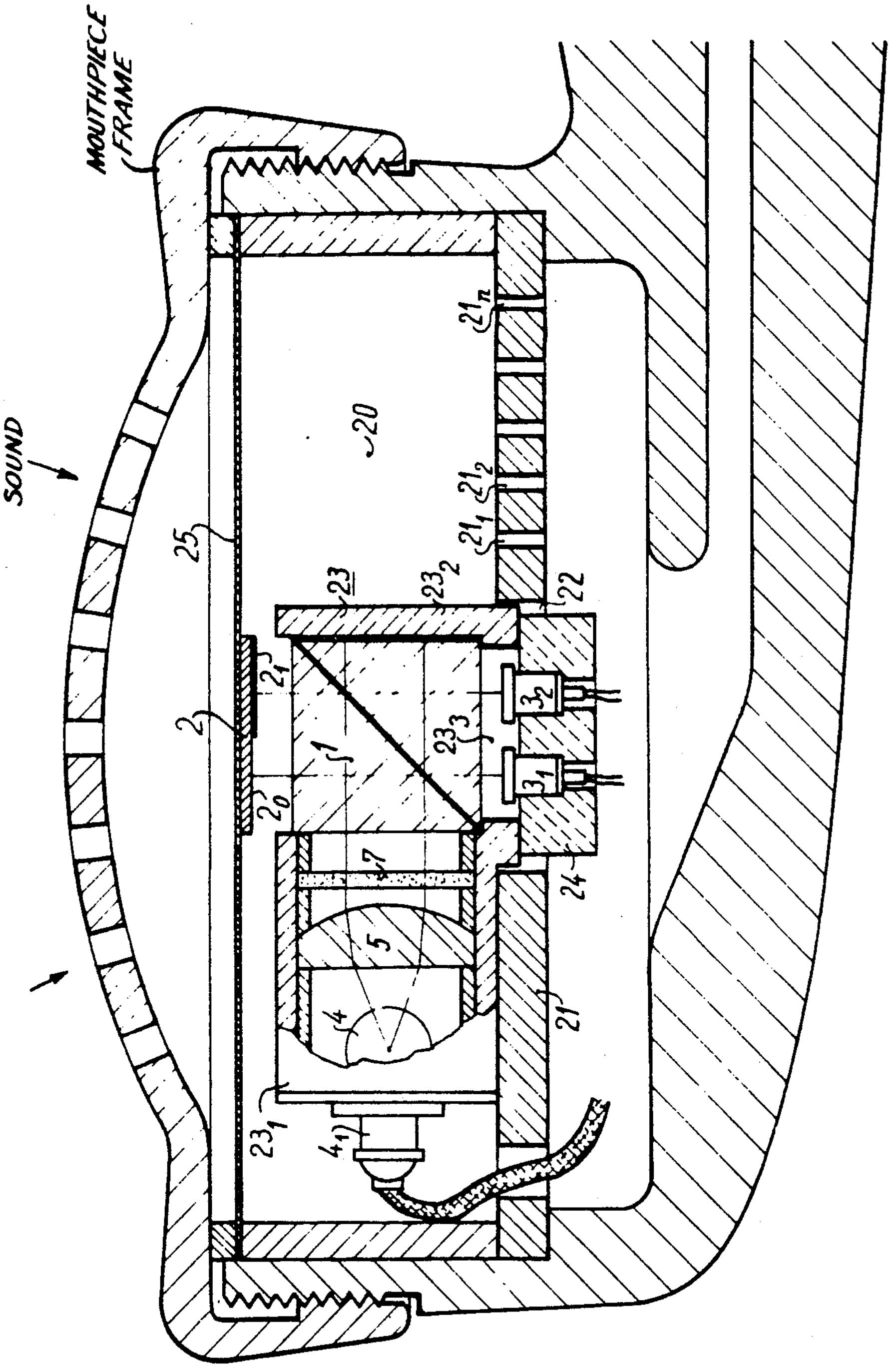
FIG. 5 shows an embodiment of an encoding microphone according to the invention for a telephone handset.

FIG. 5 shows by way of nonlimitative example an embodiment of an encoding microphone for a telephone handset, using a cube, e.g. of quartz, as shown in FIG. 2. The handset has a chamber 20 receiving the parts of the microphone embodying the invention. Chamber 20 has a metal base 21 provided with small and evenly distributed apertures $21_1$, $21_2$ .... $21_n$. Base 21 is also pierced with a rectangular aperture 22 receiving some of the base of a mounting 23 containing the constituent parts of the microphone shown in FIG. 2. Mounting 23 comprises two parts rigidly secured to one another.

The cylindrical part $23_1$ comprises:

1. At one end, the source 4 secured to a base $4_1$. The source can be e.g. an electroluminescent diode which emits infrared radiation at ambient temperature when carrying a current of 100 ma. under a voltage of 800 mV.

2. At the other end, an optical filter 7 passing only some of the infrared radiation from diode 4.

b. The oblong part $23_2$ forms the mounting for the quartz cube 1 which is introduced into its mounting $23_2$ by being slid vertically through the top aperture therein. Mounting $23_2$ is formed at its base with a rectangular aperture $23_3$ for the passage of light leaving the bottom surface of cube 1. Aperture $23_3$ is closed by an insulating plate 24 formed with two apertures to receive the two fast-response photodiodes $3_1$, $3_2$.

The diaphragm 25 which is vibrated by speech is secured near the top of mounting 23. The central part of diaphragm 25, such part being the part where the plane mirror 2 is disposed, is opposite the top surface of cube 1.

Figure 6:
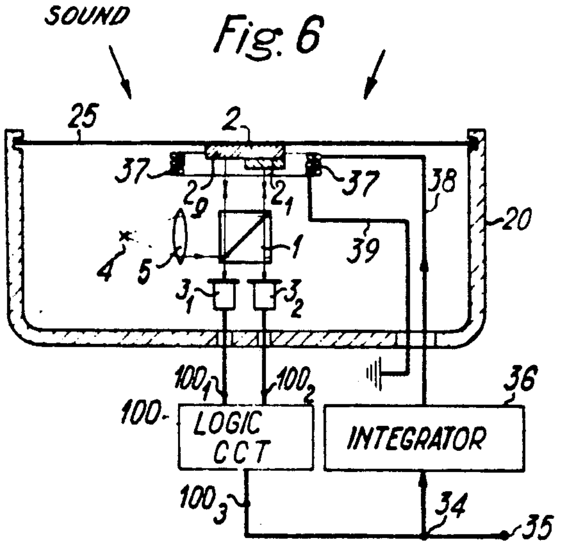
FIG. 6 shows a constructional variant of the invention wherein delta coding is produced through the agency of an electromechanical feedback circuit acting on the microphone diaphragm movement.

Referring now to FIG. 6, where elements performing the same function as in FIG. 1 have like reference numbers, an embodiment of the invention will now be described wherein direct delta coding of signals output by the, or each, photodiode can be facilitated by an extra circuit applying to the flexible diaphragm of the microphone an electromechanical feedback tending to reduce the amplitude of diaphragm vibrations. In FIG. 6, where some items of FIGS. 1–5 are shown in simplified form, microphone diaphragm 25 has its outer periphery secured to casing 20 and has on its bottom surface two mirrors $2_0$, $2_1$. The light source 4 is shown in FIG. 6 merely by a dot. The source 4 and the mirrors $2_0$, $2_1$ cooperate with the cube (formed by two prisms) and with the photodiodes $3_1$, $3_2$ in the manner hereinbefore described with reference to FIG. 2.

When the diaphragm 25 moves, the photodiodes deliver signals of varying amplitude which are applied to the logic circuit 100, similar to the corresponding circuit of FIG. 4, whose output $100_3$ is connected to the outgoing terminal 35 of the installation; output $100_3$ also being connected to input 34 of a time integrator 36 whose output is connected by line 38 to a winding 37 which is closely coupled inductively with diaphragm 25 (assumed to be made of a magnetic metal). The other end 39 of winding 37 is assumed to be connected to a constant-potential point of the installation, the diagram for which is in general shown in single wire form.

The system operates as follows:

Electrical signals whose amplitude and repetition rate vary in dependence upon the movement of the mirrors $2_0$, $2_1$ and of the diaphragm 25 are received at the output of the photodiodes $3_1$, $3_2$, the signals varying with the difference between the optical path lengths of the beams from the source 4, one such beam going directly through the cube 1 and the other going through the cube after reflection by the mirrors $2_0$, $2_1$. The signals are applied to inputs $100_1$ and $100_2$ of OR-gate 100.

The signals received at output $100_3$ are chopped at the rhythm of the clock pulses in such circuit 100. However, such signals are present at the output of OR-gate 100 only if the photodiodes $3_1$, $3_2$ deliver signals of sufficient amplitude to the inputs of OR-gate 100. The amplitude of the signals delivered by the photodiodes $3_1$, $3_2$ depends upon the amplitude of the actual movement of the diaphragm 25, and this movement now depends not just on the sound pressure acting on the top surface of diaphragm 25 but also upon the force applied thereto by the feedback winding 37, the same being energized from the output of integrator 36 in a phase tending to oppose diaphragm movement.

Consequently, the system formed by the diaphragm 25 and the auxiliary optical and electrical members acts as an amplitude comparator allowing pulses to appear at output 36 only if the instantaneous amplitude of diaphragm movement is sufficiently in excess of the amplitude represented by the current received at the output of integrator 36, the latter current resulting from time integration of the previously emitted pulses.

Clearly, therefore, the electromechanical system just described itself compares, by feedback on diaphragm movement, the instantaneous amplitude of the signal output by OR-gate 100 with the amplitude of some other signal resulting from time integration of the pulses already emitted, and this comparison is the real basis for the delta coding of the pulse train.

The foregoing also shows that the feedback applied by winding 37 to diaphragm 25 greatly reduces the movement thereof as compared with what it would be if the winding 37 was not present or was not energized. The resulting amplitude reduction is a considerable advantage since it also reduces distortion arising from large amplitudes of diaphragm vibration, including the corresponding nonlinear distortion, distortion due to mechanical resonances of the diaphragm, distortion due to compression of a volume of air behind the diaphragm etc.

In the system shown in FIG. 6, the coupling between winding 37 and diaphragm 25 can of course comprise ways and means other than just placing these two elements close together. For instance, winding 37 can be coupled with diaphragm 35 by a stationary magnetic circuit adapted to increase the force applied to the diaphragm for a given current flowing through the winding 37.

Many constructional variants of the systems shown in FIGS. 5 and 6 can be conceived of without departure from the scope of the invention. For instance, two vibratory diaphragms separated by an air cushion can be provided, one diaphragm bearing a first mirror and the other diaphragm bearing a second mirror and being mechanically coupled with a winding 37 (FIG. 6), the system formed by these mirrors being equivalent to a system formed by a mirror and the block 1 of FIGS. 1, 2 and 3. By producing multiple reflections between these two mirrors by means of semitransparent strips, system sensitivity can be increased because of the increased difference between the lengths of the light beam paths. Alternatively, multiple reflections can be used between one or two moving mirrors connected to the diaphragm and one or two fixed mirrors, or—and preferably—between one moving mirror and two stationary mirrors.

In FIG. 6, the logic circuit 100 can be embodied as a forwards and backwards pulse counter driven by the outputs of the gates 105 and 106 (FIG. 4), the counter output being connected to output $100_3$ of OR-gate 100. If the amplitude of diaphragm movements in the system shown in FIG. 6 is reduced sufficiently, an ordinary bistable circuit can be used instead of the forwards and backwards counter.

Other constructional variants combining, where applicable, the possibilities indicated in the foregoing will readily occur to the man of the art.

What I claim is:

1. A microphone circuit for converting sound pressure signals into binary coded electric signals, comprising a vibratory flexible diaphragm to which sound pressure signals are applied on one surface thereof; said diaphragm having a plane mirror secured to its other surface; a light source emitting a light beam; two photodiodes for receiving the reflected light beams from said emitter; optical means including a mirror for projecting a part of said light beam onto each one of said two photodiodes and for projecting another part of said light beam onto each of the aforesaid mirrors; further optical means for projecting the light reflected by each one of said mirrors onto a corresponding one of said photodiodes; means for converting the electric signals delivered by said photodiodes into binary coded signals, said converting means including a logic circuit comprising a pair of Schmitt trigger circuits each having an input and two outputs and to the input of each of which the electric signals from one corresponding of said photodiodes are applied; a clock pulse source; a time differentiator circuit fed from the output of one of said Schmitt trigger circuits; a first "AND" gate having two inputs respectively fed from said differentiator circuit and from one output of the other one of said Schmitt trigger circuits; a second "AND" gate having two inputs respectively fed from said differentiator circuit and from the other output of said other one of said Schmitt trigger circuits; a pair of bistable circuits each having two inputs one of which is fed from said clock pulse source and the other inputs of which are respectively fed from the outputs of one and the other of said "AND" gates; and further logic circuit means fed on one hand from the outputs of said bistable circuits and on the other hand from a pulse time distributor controlled by said clock pulse source, said further logic circuit means delivering at their output said binary coded signals.

2. A microphone circuit as claimed in claim 1 wherein two mirrors are secured to said other surface of said diaphragm and the thicknesses of said two mirrors differ by substantially one quarter wavelength of said light beam.

3. A microphone circuit as claimed in claim 1, in which said optical means comprises a cubic transparent material block formed by two isosceles prisms which have a right-angle at the apex and which are placed against one another; and in which one of the outside surfaces of the cube and one of the contacting surfaces of the prisms are covered with a semitransparent, metal, reflecting and transmitting layer.

4. A microphone circuit as claimed in claim 1, in which the output of said further logic circuit means feeds a time integrator delivering a voltage acting on a member electromechanically coupled with said diaphragm to oppose the movement thereof.

5. A microphone circuit as claimed in claim 4, in which said electromechanically coupled member is a coil inductively coupled with the diaphragm, which is made of a magnetic metal.

6. A microphone circuit as claimed in claim 1 in which said optical means comprise at least two mirrors combined with semitransparent strips, and in which said other part of light beam undergoes multiple reflections by said latter mirrors.

* * * * *